(12) United States Patent
Thiel et al.

(10) Patent No.: US 8,003,233 B2
(45) Date of Patent: Aug. 23, 2011

(54) APPLIANCE WITH COATED TRANSPARENCY

(75) Inventors: James P. Thiel, Pittsburgh, PA (US); Charles S. Voeltzel, New Kensington, PA (US); James J. Finley, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 12/486,865

(22) Filed: Jun. 18, 2009

(65) Prior Publication Data

US 2009/0252954 A1 Oct. 8, 2009

Related U.S. Application Data

(63) Continuation of application No. 11/748,856, filed on May 15, 2007, now Pat. No. 7,556,868, which is a continuation of application No. 10/850,645, filed on May 21, 2004, now abandoned.

(60) Provisional application No. 60/502,784, filed on Sep. 12, 2003, provisional application No. 60/474,813, filed on May 30, 2003.

(51) Int. Cl.
*B32B 9/00* (2006.01)

(52) U.S. Cl. ........ 428/699; 428/432; 428/426; 428/428; 428/446; 428/701; 428/702; 428/336

(58) Field of Classification Search .................. None
See application file for complete search history.

(56) References Cited

U.S. PATENT DOCUMENTS

| | | | | |
|---|---|---|---|---|
| 4,048,978 A | * | 9/1977 | Plumat et al. | 126/200 |
| 6,060,178 A | * | 5/2000 | Krisko | 428/627 |
| 2002/0136905 A1 | * | 9/2002 | Medwick et al. | 428/432 |

* cited by examiner

*Primary Examiner* — Ling Xu
(74) *Attorney, Agent, or Firm* — Andrew C. Siminerio (57) ABSTRACT

An appliance transparency, such as an oven transparency, includes at least one substrate and a coating deposited over at least a portion of the substrate. The coating includes at least one metal layer, such as a metallic silver layer. The metal layer can have a thickness in the range of 80 Å to 100 Å and optionally or the coating can have a protective coating deposited thereon.

8 Claims, 3 Drawing Sheets

APPLIANCE WITH COATED TRANSPARENCY

CROSS-REFERENCE TO RELATED APPLICATIONS

This application is a continuation of U.S. application Ser. No. 11/748,856 filed May 15, 2007, which was a continuation of U.S. application Ser. No. 10/850,645 filed May 21, 2004, which claimed the benefits of U.S. Provisional Application No. 60/474,813 filed May 30, 2003, and U.S. Provisional Application No. 60/502,784 filed Sep. 12, 2003, all of which applications are herein incorporated by reference in their entirety.

BACKGROUND OF THE INVENTION

1. Field of the Invention

This invention relates generally to transparencies, such as but not limited to transparencies for furnaces, conventional ovens, microwave ovens, convection-microwave ovens, self-cleaning ovens, refrigerators, fireplaces, and the like. In one particular aspect, this invention relates to a coated panel for use in an appliance transparency and to appliance transparencies incorporating at least one such coated panel.

2. Description of the Currently Available Technology

Appliances, such as furnaces, conventional ovens, microwave ovens, convection-microwave ovens, self-cleaning ovens, and refrigerators, just to name a few, often have a transparency through which material inside the appliance can be viewed. These appliance transparencies also typically have heat or radiation reflecting elements to reduce heat or radiation passing through the transparency.

For example, conventional oven doors typically have a transparency formed by three or four spaced glass sheets. The glass sheets are typically about 5 mm thick. The two inner sheets (closest to the oven interior) have heat reflective coatings on both their inner and outer surfaces to reduce heat from the interior of the oven escaping into the ambient atmosphere. For example, it is known to provide a conventional oven door transparency in which the inner and outer surfaces (the No. 1 and No. 2 surfaces) of the innermost sheet and also the inner and outer surfaces (the No. 3 and No. 4 surfaces) of the adjacent sheet are coated with a heat reflective fluorine-doped tin oxide coating. Conventionally, for ovens the No. 1 surface is defined as the innermost surface (i.e., the surface closest to the heat source) and the other surfaces are numbered consecutively by counting outwardly from the No. 1 surface. This fluorine-doped tin oxide coating is typically applied to the glass sheets by spray pyrolysis. While adequate for heat reflection, this conventional appliance transparency structure does have some drawbacks. For example, spray pyrolysis of the fluorine-doped tin oxide coatings can result in uneven coating thickness across the surface of the sheet. This uneven coating thickness can lead to color and reflectance variations in the coated sheet that can be aesthetically undesirable. Additionally, this conventional oven transparency structure requires the application of four separate coatings (one coating on each side of the inner two sheets).

Conventional "self-cleaning oven" doors are similar to conventional oven doors but must meet certain industry recognized safety standards, such as a maximum permissible outer temperature during cleaning, in order to be sold in the United States. In order to meet these standards, conventional self-cleaning oven doors typically have a vent system to allow for convective flow of ambient air through the door to help carry away heat to decrease the temperature of the outer door during the cleaning cycle. However, this convective flow of ambient air introduces heated air into the kitchen and can increase the ambient temperature in the kitchen, making the kitchen uncomfortable to work in.

Conventional microwave oven doors are typically formed by an inner polymeric panel (such as a Mylar® sheet), an intermediate wire mesh grid, and an outer glass sheet. The inner Mylar® panel provides ease of cleaning and the intermediate wire mesh grid prevents microwave radiation from the interior of the oven passing through the transparency. Again, while adequate for its intended purposes, this conventional microwave oven door structure does have some drawbacks. For example, the conventional microwave oven door requires three separate pieces that must be assembled in order for the door to function properly. Moreover, it may be difficult to adequately view material inside the oven through the wire mesh grid.

Therefore, it would be advantageous to provide a coated sheet or panel that can be utilized in appliance transparencies that reduces or eliminates at least some of the drawbacks described above. For example, it would be advantageous to provide a conventional oven door in which fewer than four coatings were needed to provide acceptable performance. It would be advantageous to provide an oven door, such as a self-cleaning oven door, in which the conventional vent system can be reduced or eliminated while still meeting the recognized safety standards. Additionally, it would be advantageous to provide a microwave oven transparency that eliminates at least some of the required components of conventional microwave oven transparencies and/or provides increased visibility through the microwave oven transparency.

SUMMARY OF THE INVENTION

An appliance transparency comprises at least one substrate. At least one first coating is deposited over at least a portion of the substrate. The at least one first coating can comprise at least one metal layer having a thickness in the range of 80 Å to 100 Å and/or a protective coating. The transparency can further include a second coating comprising a metal layer having a thickness in the range of 80 Å to 100 Å and/or a protective coating. In one embodiment, the substrate includes a first surface and a second surface with the first coating formed over at least a portion of the first surface and the second coating formed over at least a portion of the second surface. In a particular embodiment, the first and second coatings can each include more than one metal layer. For example, the first coating can include one or more, e.g., three, metallic silver layers and the second coating can include one or more, e.g., three, metallic silver layers. At least one of the first and second coatings can include a protective coating. Alternatively, one or more of the coatings can be a metal oxide coating free of any metal layers.

An oven transparency comprises a first panel defining a No. 1 and a No. 2 surface, a second panel spaced from the first panel and defining a No. 3 and a No. 4 surface, optionally a third panel spaced from the second panel and defining a No. 5 and a No. 6 surface, and optionally a fourth panel defining a No. 7 and a No. 8 surface. At least one coating is formed over at least a portion of at least one of the panels. The at least one coating can comprise at least one metal layer. In one embodiment, the oven transparency includes a first coating formed over at least a portion of one surface, e.g. the No. 3 surface, and a second coating formed over at least a portion of a second surface, e.g. the No. 5 and/or No. 6 surfaces. The first and second coatings can each include at least one metal layer. For example, the first coating can include one or more, e.g., three, metallic silver layers and the second coating can include one or more, e.g., three, metallic silver layers. At least one of the first and second coatings can include a protective overcoat.

An oven transparency comprises a composite panel comprising a first sheet adjacent, e.g., contacting, a second sheet. At least one of the surfaces of at least one of the sheets can include a heat and/or radiation reflecting coating. In one particular embodiment, the oven transparency comprises a first panel defining a No. 1 and a No. 2 surface, a second panel defining a No. 3 and a No. 4 surface, and optionally a third panel defining a No. 5 and a No. 6 surface. At least one panel is a composite panel comprising a first glass sheet contacting a second glass sheet.

A microwave oven transparency comprises a first panel and at least one coating formed over at least a portion of the first panel. The at least one coating can comprise at least one metal layer. For example, the at least one coating can include one or more, e.g., three, metallic silver layers. An optional polymeric layer, such as a polymeric coating or a polymeric sheet, can be provided over or adjacent to the at least one coating.

DESCRIPTION OF THE PREFERRED EMBODIMENTS

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. All documents referred to herein are to be understood to be incorporated by reference in their entirety. As used herein, the terms "polymer" or "polymeric" refer to oligomers, homopolymers, copolymers, and terpolymers, e.g., polymers formed from two or more types of monomers or polymers. The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 300 nm to less than 380 nm. The terms "microwave region" or "microwave radiation" refer to electromagnetic radiation having a frequency in the range of 300 megahertz to 300 gigahertz.

The invention will first be described with reference to use in a transparency for a conventional oven door and then with reference to transparencies for conventional microwave ovens, conventional convection-microwave ovens, and conventional self-cleaning ovens. However, it is to be understood that these are simply exemplary uses of the invention and that the invention is not limited to these particularly disclosed examples. Moreover, the invention need not be limited to use with appliance transparencies but could be utilized for other articles, such as but not limited to vehicle transparencies such as automotive windshields, sidelights, back lights, moon roofs, sun roofs, aviation transparencies, boat or other marine transparencies, refrigerator doors, skylights, and fireplace screens, just to name a few. The invention can be practiced with laminated or monolithic articles. By "monolithic" is meant having a single structural ply. Additionally, while a typical appliance or vehicle "transparency" can have sufficient visible light transmittance such that materials can be viewed through the transparency, in the practice of the invention the "transparency" need not be transparent to visible light but could be translucent or opaque (as described below).

Figure 1:
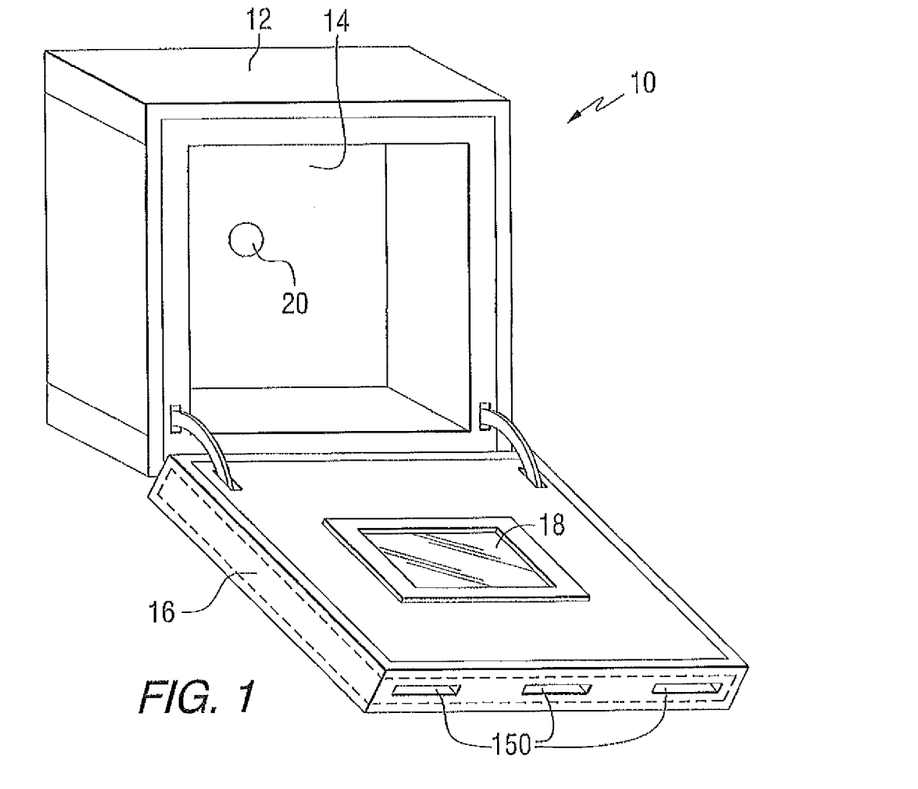
FIG. 1 is a perspective view (not to scale) of an exemplary appliance in the form of an oven incorporating features of the invention.

An exemplary appliance in the form of an oven 10 is shown in FIG. 1. Since the structure and operation of conventional ovens (including self-cleaning ovens and microwave ovens) will be well understood by those of ordinary skill in the art, a detailed description will not be provided. The oven 10 includes a body 12 having an interior cooking chamber 14. An access, e.g., a hinged oven door 16, provides access to the cooking chamber 14. A transparency 18 can be provided, e.g., in the oven door 16, such that when the door 16 is closed, material in the cooking chamber 14 can be viewed. The cooking chamber 14 typically includes one or more heat sources 20. In a conventional oven, the heat source 20 typically includes electrically heated metal grids or gas burners. In a microwave oven, the heat source 20 typically includes one or more radiation sources, e.g., microwave radiation sources. For convection-microwave ovens, the heat sources 20 can include both electrically heated grids and microwave radiation sources. In conventional self-cleaning ovens, the door 16 typically includes a plurality of top vents 150 and a plurality of bottom vents (not shown) that allow for convective flow of ambient air through the door 16 as described in more detail below.

Figure 2:
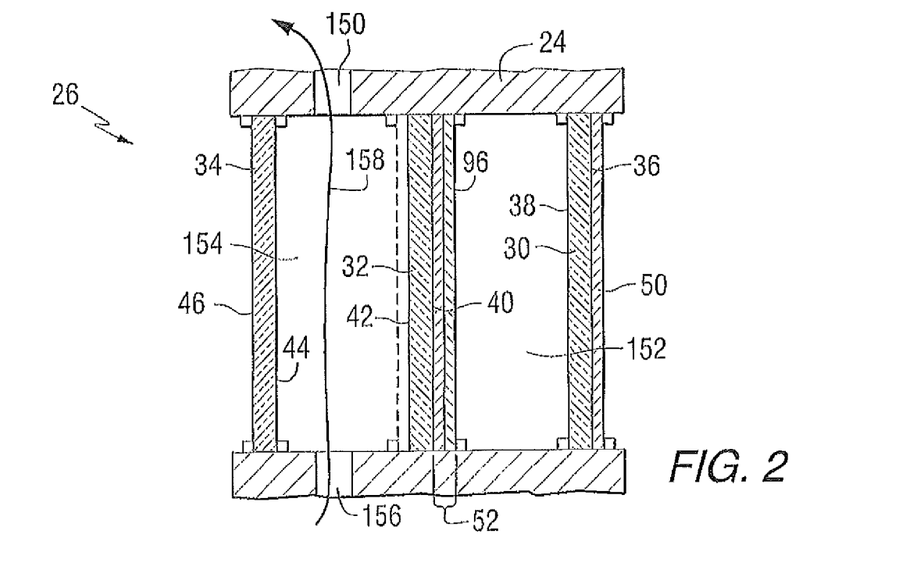
FIG. 2 is a partial sectional view (not to scale) of an oven door having a transparency incorporating features of the invention.

Use of the invention with a conventional oven transparency will first be described. As discussed above, conventional oven transparencies typically are formed by three or four spaced glass sheets having fluorine-doped tin oxide coatings on the inner and outer surfaces of the two inner glass sheets (i.e., a total of four coated surfaces). However, an exemplary oven door 24 having a transparency 26 incorporating features of the invention is shown in FIG. 2. The transparency 26 includes at least one sheet or panel having at least one coating incorporating features of the invention. The at least one coating can have at least one metal layer. In the exemplary embodiment shown in FIG. 2, the transparency 26 includes three spaced panels 30, 32, 34 held in a conventional spacer assembly in any conventional manner. However, it is to be understood that the invention is not limited to use with three panels but could be used with four or more panels. The first or inner panel 30 (closest to the interior of the cooking chamber 14) has an inner surface 36 (No. 1 surface) facing the chamber 14 and an outer surface 38 (No. 2 surface). The second or middle panel 32 is spaced from the first panel 30 by the spacer assembly and includes an inner surface 40 (No. 3 surface) and an outer surface 42 (No. 4 surface). The third or outer panel 34 is spaced from the second panel 32 and includes an inner surface 44 (No. 5 surface) and an outer surface 46 (No. 6 surface). Although not shown, the transparency 26 could include a fourth panel spaced outwardly from the third panel 34. The exemplary transparency 26 includes at least one first coating 50 formed over at least a portion of one of the panel surfaces and at least one second coating 52 formed over at least a portion of another surface. In the illustrated exemplary transparency 26, the first coating 50 is shown formed over the No. 1 surface 36 and the second coating 52 is shown formed over the No. 3 surface 40. However, it is to be understood that the first and second coatings 50, 52 need not be limited to these positions. The first and second coatings 50, 52 could be provided on any of the surfaces. For example but not limiting to the invention, the first coating 50 could be located on the No. 4 surface 42 as shown by the dashed line in FIG. 2 and the second coating 52 on the No. 3 surface 40. Alternatively, the first coating 50 could be located on the No. 3 surface and the second coating 52 on the No. 4 surface or the No. 5 surface.

A first air gap 152 is defined between the first and second panels 30, 32 and a second air gap 154 is defined between the second and third panels 32, 34. As described above, conventional "self-cleaning oven" doors typically include a plurality of bottom vents 156 and a plurality of top vents 150. However, as described in more detail below, in one practice of the invention, these vents 150, 156 can be significantly reduced in dimension or eliminated all together.

In the broad practice of the invention, the panels 30, 32, 34 of the transparency 26 can be of the same or different materials. The panels can include any desired material having any desired characteristics. For example, one or more of the panels can be transparent, translucent, or opaque to visible light. By "transparent" is meant having visible light transmittance of greater than 0% to 100%. Alternatively, one or more of the panels can be translucent or opaque. By "translucent" is meant allowing electromagnetic energy (e.g., visible light) to pass through but diffusing this energy such that objects on the side opposite the viewer are not clearly visible. By "opaque" is meant having a visible light transmittance of 0%. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); metal substrates, such as but not limited to galvanized steel, stainless steel, and aluminum; ceramic substrates; tile substrates; glass substrates; or mixtures or combinations of any of the above. For example, one or more of the panels can include conventional untinted soda-lime-silica glass, i.e., "clear glass", or can include tinted or otherwise colored glass, borosilicate glass, leaded glass, tempered, untempered, annealed, or heat-strengthened glass. The glass may be of any type, such as conventional float glass or flat glass, and may be of any composition having any optical properties, e.g., any value of visible radiation transmission, ultraviolet radiation transmission, infrared radiation transmission, microwave energy transmission, and/or total solar energy transmission. Types of glass suitable for the practice of the invention are described in, but are not limited to, U.S. Pat. Nos. 4,746,347; 4,792,536; 5,240,886; 5,385,872; and 5,393,593. Further, one or more of the panels can include a plastic and/or polymeric substrate with a coating of the invention deposited on the polymeric substrate's surface.

The first coating 50 can be a heat and/or radiation reflecting coating and can have one or more functional coating layers or films of the same or different composition and/or functionality. As used herein, the term "film" refers to a coating region of a desired or selected coating composition. A "layer" can comprise one or more "films" and a "coating" or "coating stack" can comprise one or more "layers". For example, the first coating 50 can be a single layer coating or a multi-layer coating and can include one or more metals, non-metals, semi-metals, semiconductors, and/or alloys, compounds, compositions, combinations, or blends thereof. For example, the first coating 50 can be a single layer metal oxide coating, a multiple layer metal oxide coating, a non-metal oxide coating, a metallic nitride or oxynitride coating, a non-metallic nitride or oxynitride coating, or a multiple layer coating comprising one or more of any of the above materials. In one non-limiting embodiment, the first coating 50 can be a doped metal oxide coating, such as a fluorine-doped tin oxide coating, e.g. a NESA® coating commercially available from PPG Industries, Inc of Pittsburgh, Pa. An example of one suitable coating material for use as the first coating 50 is SUNGATE® 500 coating, which is a multilayered transparent conductive oxide coating commercially available from PPG Industries, Inc of Pittsburgh, Pa. and described in further detail in U.S. Pat. No. 6,436,541. Other suitable coatings are commercially available from PPG Industries, Inc. under the SUNGATE® and SOLARBAN® families of coatings. In another embodiment, the first coating 50 can have one or more metal layers, such as described below for the second coating 52. The first coating 50 can be deposited by any conventional method, such as by the methods described below for the second coating 52.

The first coating 50 can have any desired thickness. In one particular example, the first coating 50 can be a SUNGATE® 500 coating having a thickness in the range of greater than 0 Å to 10,000 Å, such as 500 Å to 8,000 Å, such as 2,000 Å to 6,000 Å, such as 3,000 Å to 5,000 Å, such as 4,000 Å.

Contrary to conventional oven door transparencies, the second coating 52 can include one or more heat and/or radiation reflective metal layers or films comprising a reflective metal, e.g., a noble metal such as but not limited to gold, copper, or silver, or combinations or alloys thereof. The second coating 52 can also include one or more anti-reflective and/or dielectric coating materials, such as metal oxides or oxides of metal alloys.

Figure 3:
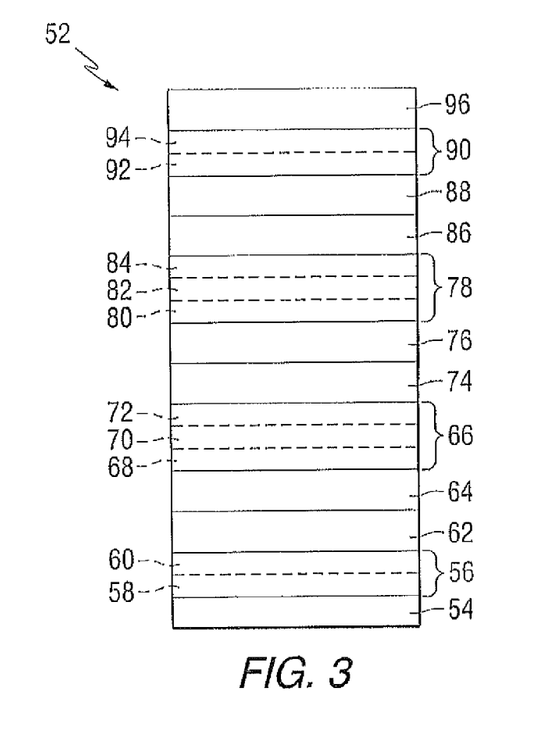
FIG. 3 is a side, sectional view (not to scale) of a coated panel of the invention useful for forming an appliance transparency.

An exemplary second coating 52 is shown in FIG. 3. The second coating 52 can be deposited over a substrate 54 (panel) by any conventional method, such as but not limited to conventional chemical vapor deposition (CVD) and/or physical vapor deposition (PVD) methods. Examples of CVD processes include spray pyrolysis, chemical vapor deposition (CVD), and sol-gel deposition. Examples of PVD processes include electron beam evaporation and vacuum sputtering (such as magnetron sputter vapor deposition (MSVD)). In one non-limiting embodiment, the coating 52 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

The illustrated exemplary second coating 52 includes a base layer or first dielectric layer 56 deposited over at least a portion of a major surface of the substrate 54. The first dielectric layer 56 can comprise one or more films of anti-reflective materials and/or dielectric materials, such as but not limited to metal oxides, oxides of metal alloys, nitrides, oxynitrides, or mixtures thereof. The first dielectric layer 56 can be transparent to visible light. Examples of suitable metal oxides for the first dielectric layer 56 include oxides of titanium, hafnium, zirconium, niobium, zinc, bismuth, lead, indium, tin, and mixtures thereof. These metal oxides can have small amounts of other materials, such as manganese in bismuth oxide, indium in tin oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 56 can be a substantially single phase film, such as a metal alloy oxide film, e.g., zinc stannate, or can be a mixture of phases composed of zinc and tin oxides or can be composed of a plurality of metal oxide films, such as those disclosed in U.S. Pat. Nos. 5,821,001; 4,898,789; and 4,898,790.

In the illustrated exemplary embodiment, the first dielectric layer 56 can comprise a multi-film structure having a first metal alloy oxide film 58 deposited over at least a portion of the major surface of the substrate 54 and a second metal oxide film 60 deposited over the first metal alloy oxide film 58. In one embodiment, the first dielectric layer 56 can have a total thickness of less than or equal to 500 Å, e.g., less than or equal to 300 Å, e.g., less than or equal to 280 Å. For example, the metal alloy oxide-containing film 58 can have a thickness in the range of 100 Å to 500 Å, such as 150 Å to 400 Å, e.g., 200 Å to 250 Å. The metal oxide film 60 can have a thickness in the range of 50 Å to 200 Å, such as 75 Å to 150 Å, e.g., 100 Å. In one embodiment, the metal mixture or alloy oxide-containing film 58 can have a majority of a zinc/tin alloy oxide. The zinc/tin alloy oxide can be that obtained from magnetron sputtering vacuum deposition from a cathode of zinc and tin that can comprise zinc and tin in proportions of 10 wt. % to 90 wt. % zinc and 90 wt. % to 10 wt. % tin. One suitable metal alloy oxide that can be present in the film is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to 0.9. For example where x=⅔ Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film. The metal oxide film 60 can be a zinc-containing film, such as zinc oxide. The zinc oxide film can include other materials to improve the sputtering characteristics of the associated cathode, e.g., the zinc oxide can contain 0 to 20 wt. % tin, e.g., 0 to 15 wt. % tin, e.g., 0 to 10 wt. % tin.

A first heat and/or radiation reflective film or layer 62 can be deposited over the first dielectric layer 56. The first reflective layer 62 can include a reflective metal, such as but not limited to metallic gold, copper, silver, or mixtures, alloys, or combinations thereof. The first reflective layer 62 can have a thickness in the range of 25 Å to 300 Å, e.g., 50 Å to 300 Å, e.g., 50 Å to 150 Å, such as 70 Å to 110 Å, such as 75 Å to 100 Å, e.g., 80 Å to 90 Å. In one embodiment, the first reflective layer 62 comprises a metallic silver layer.

A first primer film 64 can be deposited over the first reflective layer 62. The first primer film 64 can be an oxygen capturing material, such as titanium, that can be sacrificial during the deposition process to prevent degradation or oxidation of the first reflective layer 62 during a sputtering process. The oxygen capturing material can be chosen to oxidize before the material of the first reflective layer 62. In one embodiment, the first primer film 64 can have a thickness in the range of 5 Å to 50 Å, e.g., 10 Å to 40 Å, e.g., 12 Å to 20 Å.

An optional second dielectric layer 66 can be deposited over the first reflective layer 62 (e.g., over the first primer film 64). The second dielectric layer 66 can comprise one or more metal oxide or metal alloy oxide-containing films, such as those described above with respect to the first dielectric layer 56. In the illustrated embodiment, the second dielectric layer 66 includes a first metal oxide layer 68, e.g., zinc oxide, deposited over the first primer film 64. A second metal alloy oxide layer 70, e.g., a zinc stannate layer, can be deposited over the first zinc oxide layer 68. A third metal oxide layer 72, e.g., another zinc oxide layer, can be deposited over the zinc stannate layer 70 to form the multi-film layer 66. Each metal oxide layer 68, 72 of the second dielectric layer 66 can have a thickness in the range of about 50 Å to 200 Å, e.g., 75 Å to 150 Å, e.g., 100 Å. The metal alloy oxide layer 70 can have a thickness in the range of 100 Å to 500 Å, e.g., 200 Å to 500 Å, e.g., 300 Å to 500 Å, e.g., 400 Å.

An optional second heat and/or radiation reflective layer 74 can be deposited over the second dielectric layer 66. The second reflective layer 74 can include any one or more of the reflective materials described above with respect to the first reflective layer 62. The second reflective layer 74 can have a thickness in the range of 25 Å to 150 Å, e.g., 50 Å to 100 Å, e.g., 80 Å to 90 Å. In the illustrated embodiment, the second reflective layer 74 includes silver. In another embodiment, this second reflective layer 74 can be thicker than each of the first and third reflective layers.

An optional second primer film 76 can be deposited over the second reflective layer 74. The second primer film 76 can be any of the materials described above with respect to the first primer film 64. The second primer film 76 can have a thickness in the range of about 5 Å to 50 Å, e.g., 10 Å to 25 Å, e.g., 12 Å to 20 Å. In the illustrated embodiment, the second primer film 76 includes titanium.

An optional third dielectric layer 78 can be deposited over the second reflective layer 74 (e.g., over the second primer film 76). The third dielectric layer 78 can also include one or more metal oxide or metal alloy oxide-containing layers such as discussed above with respect to the first and second dielectric layers 56, 66. In the illustrated embodiment, the third dielectric layer 78 is a multi-film layer similar to the second dielectric layer 66. For example, the third dielectric layer 78 can include a first metal oxide layer 80, e.g., a zinc oxide layer, a second metal alloy oxide-containing layer 82, e.g., a zinc stannate layer, deposited over the zinc oxide layer 80, and a third metal oxide layer 84, e.g., another zinc oxide layer, deposited over the zinc stannate-containing layer 82. The metal oxide layers 80, 84 can have thicknesses in the range of 50 Å to 200 Å, such as 75 Å to 150 Å, e.g., 100 Å. The metal alloy oxide layer 82 can have a thickness in the range of 100 Å to 500 Å, e.g., 200 Å to 500 Å, e.g., 300 Å to 500 Å, e.g., 400 Å.

The coating 52 can further include an optional third heat and/or radiation reflective layer 86 deposited over the third dielectric layer 78. The third reflective layer 86 can be of any of the materials discussed above with respect to the first and second reflective layers 62, 74. The third reflective layer 86 can have a thickness in the range of 50 Å to 100 Å, e.g., 70 Å to 90 Å, e.g., 75 Å to 85 Å. In the illustrated embodiment, the third reflective layer 86 includes silver. In one embodiment, when the first, second, and/or third reflective layers have or contain silver, the total amount of silver for the coating 52 can range in the amount of 29 to 44 micrograms per centimeter 2 (ugm/cm$^2$), such as 36.5 ugm/cm$^2$.

An optional third primer film 88 can be deposited over the third reflective layer 86. In one embodiment, the third primer film 88 can be of any of the primer materials described above. The third primer film 88 can have a thickness in the range of 5 Å to 50 Å, e.g., 10 Å to 25 Å, e.g., 12 Å to 20 Å. In the illustrated embodiment, the third primer film 88 is titanium.

An optional fourth dielectric layer 90 can be deposited over the third reflective layer 86 (e.g., over the third primer film 88). The fourth dielectric layer 90 can be comprised of one or more metal oxide or metal alloy oxide-containing layers, such as those discussed above with respect to the first, second, or third dielectric layers. In one embodiment, the fourth dielectric layer 90 is a multi-film layer having a first metal oxide layer 92, e.g., a zinc oxide layer, deposited over the third primer film 88 and a second metal alloy oxide layer 94, e.g., a zinc stannate layer, deposited over the zinc oxide layer 92. The metal oxide layer 92 can have a thickness in the range of 25 Å to 200 Å, such as 50 Å to 150 Å, such as 100 Å. The metal alloy oxide layer 94 can have a thickness in the range of 25 Å to 500 Å, e.g., 50 Å to 250 Å, e.g., 100 Å to 150 Å. A suitable coating 52 for the practice of the invention is disclosed in U.S. patent application Ser. No. 10/364,089.

The coating 52 can include a protective coating 96, e.g., deposited over the optional fourth dielectric layer 90 (if present), to assist in providing protection against mechanical and chemical attack. The protective coating 96 can be of any desired material or mixture of materials. In one exemplary embodiment, the protective coating 96 can include a layer having one or more metal oxide materials, such as but not limited to, aluminum oxide, silicon oxide, or mixtures thereof. For example, the protective coating 96 can be a single coating layer comprising in the range of 0 wt. % to 100 wt. % alumina and/or 0 wt. % to 100 wt. % silica, such as 5 wt. % to 100 wt. % alumina and 95 wt. % to 0 wt. % silica, such as 10 wt. % to 90 wt. % alumina and 90 wt. % to 10 wt. % silica, such as 15 wt. % to 90 wt. % alumina and 85 wt. % to 10 wt. % silica, such as 50 wt. % to 75 wt. % alumina and 50 wt. % to 25 wt. % silica, such as 50 wt. % to 70 wt. % alumina and 50 wt. % to 30 wt. % silica, such as 35 wt. % to 100 wt. % alumina and 65 wt. % to 0 wt. % silica, e.g., 70 wt. % to 90 wt. % alumina and 10 wt. % to 30 wt. % silica, e.g., 75 wt. % to 85 wt. % alumina and 15 wt. % to 25 wt. % of silica, e.g., 88 wt. % alumina and 12 wt. % silica, e.g., 65 wt. % to 75 wt. % alumina and 25 wt. % to 35 wt. % silica, e.g., 70 wt. % alumina and 30 wt. % silica, e.g., 60 wt. % to less than 75 wt. % alumina and greater than 25 wt. % to 40 wt. % silica. Other materials, such as aluminum, chromium, hafnium, yttrium, nickel, boron, phosphorous, titanium, zirconium, and/or oxides thereof, can also be present, such as to adjust the refractive index of the coating. In one embodiment, the refractive index of the protective coating 96 can be in the range of 1 to 3, such as 1 to 2, such as 1.4 to 2, such as 1.4 to 1.8.

Alternatively, the protective coating 96 can be a multi-layer coating formed by separately formed layers of metal oxide materials, such as but not limited to a bi-layer formed by one metal oxide-containing layer (e.g., a silica and/or alumina-containing first layer) formed over another metal oxide-containing layer (e.g., a silica and/or alumina-containing second layer). The individual layers of the multi-layer protective coating 96 can be of any desired thickness.

The protective coating 96 can be of any desired thickness. In one embodiment, the protective coating 96 can have a thickness in the range of 100 Å to 50,000 Å, such as 500 Å to 50,000 Å, e.g., 500 Å to 10,000 Å, such as 100 Å to 3,000 Å, e.g., 100 Å to 2,000 Å, such as 2,000 Å to 3,000 Å. In other non-limiting embodiments, the protective coating 96 can have a thickness in the range of 100 Å to 10 microns, such as 101 Å to 1,000 Å, or 1,000 Å to 1 micron, or 1 micron to 10 microns, or 200 Å to 1,000 Å, or 5,000 Å to 8,000 Å. Further, the protective coating 96 can be of non-uniform thickness. By "non-uniform thickness" is meant that the thickness of the protective coating 96 can vary over a given unit area, e.g., the protective coating 96 can have high and low spots or areas.

In one non-limiting embodiment, the protective coating 96 can comprise a first layer and a second layer formed over the first layer. In one specific non-limiting embodiment, the first layer can comprise alumina or a mixture or alloy comprising alumina and silica. For example, the first layer can comprise a silica/alumina mixture having greater than 5 wt. % alumina, such as greater than 10 wt. % alumina, such as greater than 15 wt. % alumina, such as greater than 30 wt. % alumina, such as greater than 40 wt. % alumina, such as 50 wt. % to 70 wt. % alumina, such as in the range of 70 wt. % to 100 wt. % alumina and 30 wt. % to 0 wt. % silica. In one non-limiting embodiment, the first layer can have a thickness in the range of greater than 0 Å to 1 micron, such as 50 Å to 100 Å, such as 100 Å to 250 Å, such as 101 Å to 250 Å, such as 100 Å to 150 Å, such as greater than 100 Å to 125 Å. The second layer can comprise silica or a mixture or alloy comprising silica and alumina. For example, the second layer can comprise a silica/alumina mixture having greater than 40 wt. % silica, such as greater than 50 wt. % silica, such as greater than 60 wt. % silica, such as greater than 70 wt. % silica, such as greater than 80 wt. % silica, such as in the range of 80 wt. % to 90 wt. % silica and 10 wt. % to 20 wt. % alumina, e.g., 85 wt. % silica and 15 wt. % alumina. In one non-limiting embodiment, the second layer can have a thickness in the range of greater than 0 Å to 2 microns, such as 50 Å to 5,000 Å, such as 50 Å to 2,000 Å, such as 100 Å to 1,000 Å, such as 300 Å to 500 Å, such as 350 Å to 400 Å. Suitable protective coatings 96 are described, for example, in U.S. patent application Ser. Nos. 10/007,382; 10/133,805; 10/397,001; 10/422,094; 10/422,095; and 10/422,096.

Thus, the above-described exemplary conventional oven door 24 utilizes two coated surfaces (e.g., No. 1 and No. 3 surfaces or No. 3 and No. 4 surfaces) rather than four coated surfaces of the known art. At least one of the coatings can include a reflective metal layer to reflect heat and/or radiation.

Figure 4:
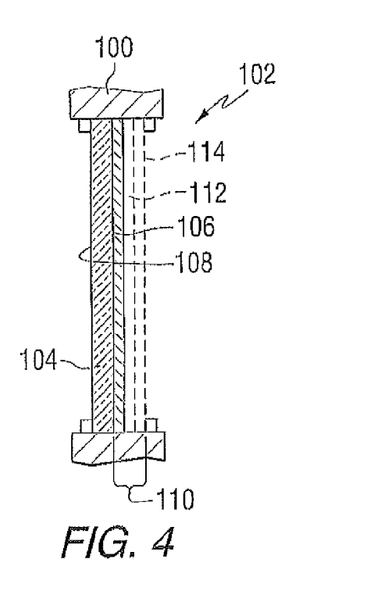
FIG. 4 is a partial sectional view (not to scale) of an exemplary microwave oven door having a transparency incorporating features of the invention.

As discussed above, the invention is not limited to use with conventional oven transparencies. An exemplary microwave oven door 100 having a transparency 102 incorporating features of the invention is shown in FIG. 4. The microwave transparency 102 can be held in a microwave oven door 100 in any conventional manner, such as by a conventional frame assembly. The transparency 102 includes a panel 104 having an inner (No. 1) surface 106 and an outer (No. 2) surface 108. A coating 110 of the invention can be deposited over at least a portion of the panel 104, e.g., over at least a portion of the inner (No. 1) surface 106.

The panel 104 can be of any material as described above for the panels of the conventional convection oven. In one embodiment, the panel 104 is glass.

The coating 110 can be a single layer coating or a multi-layer coating, such as described above for the first or second coatings 50, 52. The coating 110 can include one or more reflective layers, e.g., metal layers, such as described above for the coating 52. In one non-limiting embodiment, the coating 110 includes at least one, e.g., two or three, metallic silver reflective layers. The coating 110 can also include an optional protective coating 112, such as described above with respect to the protective coating 96. In one embodiment, the protective coating 112 can have a thickness in the range of 100 Å to 10 microns, such as 1,000 Å to 9,000 Å, such as 5,000 Å to 8,000 Å. The reflective metal layer(s) of the coating 110 can be selected to reflect microwave energy, which eliminates the need for the metal grid found in conventional microwave ovens. The coating 110 can provide a conductivity of less than or equal to 20 ohms per square, such as less than or equal to 10 ohms per square, such as less than or equal to 5 ohms per square.

The transparency 102 can also include an optional polymeric layer 114. The polymeric layer 114 can be a polymeric coating deposited over the coating 110 in any conventional manner, such as but not limited to brushing, spraying, pouring, or electrocoating. Alternatively, the polymeric layer 114 can be a polymeric sheet, e.g., a Mylar® sheet, adhered to the panel 104, e.g. adjacent the coating 110, in any conventional manner. The polymeric layer 114 can include any polymeric material. The "polymeric material" can comprise one polymeric component or can comprise a mixture of different polymeric components, such as but not limited to one or more plastic materials, such as but not limited to one or more thermoset or thermoplastic materials. Useful thermoset components include polyesters, epoxides, phenolics, and polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

Suitable acrylic polymers include copolymers of one or more of acrylic acid, methacrylic acid and alkyl esters thereof, such as methyl methacrylate, ethyl methacrylate, hydroxyethyl methacrylate, butyl methacrylate, ethyl acrylate, hydroxyethyl acrylate, butyl acrylate and 2-ethylhexyl acrylate. Other suitable acrylics and methods for preparing the same are disclosed in U.S. Pat. No. 5,196,485.

Useful polyesters and alkyds can be prepared in a known manner by condensation of polyhydric alcohols, such as ethylene glycol, propylene glycol, butylene glycol, 1,6-hexylene glycol, neopentyl glycol, trimethylolpropane and pentaerythritol, with polycarboxylic acids such as adipic acid, maleic acid, fumaric acid, phthalic acids, trimellitic acid or drying oil fatty acids. Examples of suitable polyester materials are disclosed in U.S. Pat. Nos. 5,739,213 and 5,811,198.

Useful polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate). The term "polyurethane" as used herein is intended to include polyurethanes as well as polyureas, and poly(urethane-ureas).

Suitable epoxy-functional materials are disclosed in U.S. Pat. No. 5,820,987.

Useful vinyl resins include polyvinyl acetyl, polyvinyl formal, and polyvinyl butyral.

The polymeric layer 114 can have any desired thickness. In one non-limiting embodiment, the thickness can be in the range of 0.1 mm to 5 mm. The polymeric material can have any desired refractive index. In one embodiment, the polymeric material has a refractive index in the range of 1.4 to 1.7, such as 1.5 to 1.6.

Figure 5:
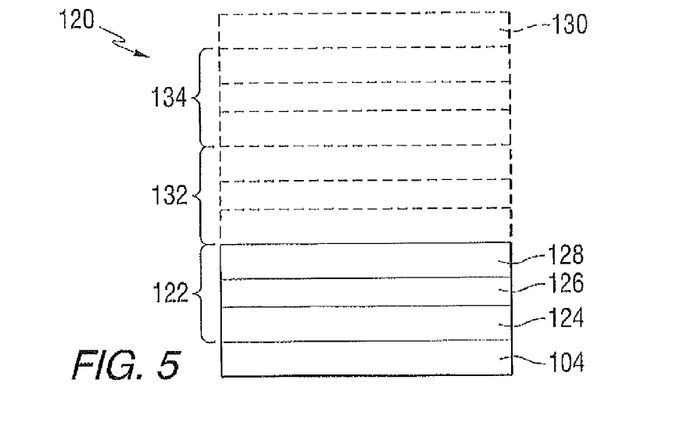
FIG. 5 is a side, sectional view (not to scale) of another coated panel of the invention useful for forming an appliance transparency.

An alternative coating 120 particularly useful for microwave doors is shown in FIG. 5. The coating 120 includes a coating unit 122 comprising a first dielectric layer 124, a reflective metal layer 126, and a second dielectric layer 128. The first and/or second dielectric layers 124, 128 and the reflective metal layer 126 can be of any of the materials described above for the dielectric layers or reflective metallic layers of the coating 52. In one non-limiting embodiment, the first and second dielectric layers 124, 128 comprise zinc stannate and the reflective layer 126 comprises silver. The dielectric layers 124, 128 and the reflective layer 126 can be of any desired thickness. In one non-limiting embodiment, the first and/or second dielectric layers can have thicknesses in the range of 50 Å to 500 Å, such as 300 Å to 400 Å, such as 350 Å. The reflective metal layer 126 can have a thickness in the range of 50 Å to 150 Å, such as 75 Å to 125 Å, such as 80 Å to 100 Å, such as 90 Å. A protective coating 130, such as that described above for the protective coating 96, can be formed over the coating 120. The coating 120 can include one coating unit 122 or, as shown by dashed lines in FIG. 5, can include a plurality of coating units, such as a second coating unit 132 and a third coating unit 134, of similar structure to the first coating unit 122.

While in the embodiment described above the transparency 102 was held in a frame assembly, it is to be understood that the transparency 102 itself could form the microwave oven door without the need for a separate frame assembly. For example, the door hardware, e.g., hinges, handle, etc., could be connected directly to the glass transparency 102 and the transparency 102 itself could form the door.

Figure 6:
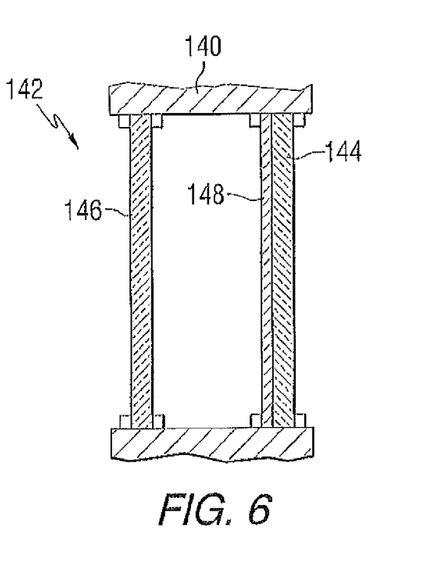
FIG. 6 is a partial sectional view (not to scale) of a convection-microwave oven door having a transparency incorporating features of the invention.

An exemplary door 140 having a transparency 142 particularly useful for a convection-microwave oven is shown in FIG. 6. The transparency 142 includes a first (inner) panel 144 and a second (outer) panel 146. The panels 144, 146 can be spaced apart in any conventional manner, such as by a conventional spacer assembly. The panels 144, 146 can be of any of the materials described above for the previously described panels. The transparency 142 includes at least one coating 148. In the broad practice of the invention, the coating 148 can be any coating having at least one metallic layer capable of preventing microwave radiation passing through the transparency. For example, the coating 148 can be similar to the coating 52 or the coating 120 described above. The coating 148 can be formed on any panel surface, such as but not limited to the No. 2 surface as shown in FIG. 6.

Figure 7:
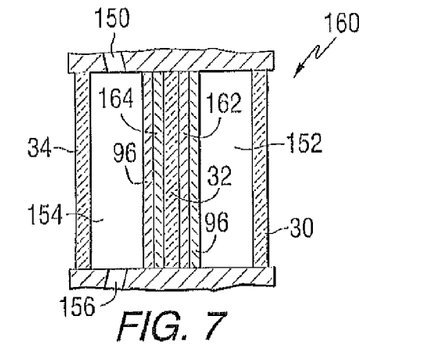
FIG. 7 is a side, sectional view (not to scale) of a self-cleaning oven door incorporating features of the invention.

As discussed above, conventional self-cleaning oven doors must meet certain industry recognized safety standards to be sold commercially in the United States. For example, at a cleaning temperature of 875° F. (468° C.) in the interior of the oven, the outermost glass ply (third ply 34 in FIG. 2) should have an outer surface temperature (at the No. 6 surface) of less than 170° F. (77° C.) at an ambient air temperature of 77° F. (25° C.). In order to provide additional cooling for the outer ply, conventional self-cleaning oven doors typically include a vent system to allow convective flow of ambient air in the air gap between the outer two plies. The vent system typically includes a plurality of bottom vents 156 located along the bottom of the door and a plurality of top vents 150 located along the top of the door (FIGS. 1, 2, and 7). During the self-cleaning cycle, ambient air flows along the flow path (shown by arrow 158 in FIG. 2) from the bottom vent(s) 156, between the outer two plies, and out of the top vent(s) 150. This convective flow helps carry away heat from the outer surface (No. 4 surface) of the second ply, which in turn helps to reduce the temperature of the outer surface (No. 6 surface) of the outer ply. However, a drawback of this conventional system is that the heated air flowing out of the top vents 150 flows into the kitchen and, thus, increases the ambient temperature in the kitchen.

In the practice of the invention, the metal oxide or NESA coatings of the conventional self-cleaning oven door structure are replaced and/or substituted with one or more coatings containing reflective metal layers. FIG. 7 shows one exemplary embodiment of an oven door 160, such as a self-cleaning oven door, incorporating features of the invention. In this embodiment, the inner panel 30 and outer panel 34 can be conventional clear glass and can be free of coatings deposited thereon. The second panel 32 has a first coating 162 that can contain at least one metal layer. In one non-limiting embodiment, the coating 162 can be positioned on the No. 3 surface. The second panel 32 can also include a second coating 164 that can contain at least one metal layer and can be positioned, for example, on the No. 4 surface. The coatings 162, 164 can be the same or different and can be, for example, the same as the coatings 50 and/or 52 described above. In one embodiment, the first coating 162 and/or the second coating 164 can contain one or more metallic silver layers, such as two or more metallic silver layers, such as three or more metallic silver layers.

As will be appreciated by one skilled in the art, during routine cleaning of the oven door 160, some of the cleaning solvent may be sprayed through the vents 150, 156 (if present) and land on the coating 164. This cleaning solvent could degrade or dissolve portions of the coating 164. One option to address this problem is to apply a protective coating over the coating 164 to protect the coating 164 against solvent attack. For example, a protective coating 96, such as a metal oxide protective coating as described above, could be deposited over at least a portion of the coating 164. In one embodiment, the protective coating 96 can have a thickness in the range of 1,500 Å to 5,000 Å, such as greater than 2,000 Å, such as 2,000 Å to 4,000 Å. A protective coating 96 could also be applied over the coating 162. However, applying such thick protective coatings over the coatings 162 and/or 164 means that the production line may have to be slowed down in order to apply the protective coating(s), thus limiting the throughput.

Alternatively, rather than applying such thick protective coating(s) 96, the invention teaches that the vents 150, 156 can be eliminated or reduced in size to such an extent that there would be little or no chance of solvent passing through the vents (if present) and landing on the coating 164. In which case, a protective coating 96 on the coating 164 could be greatly reduced in thickness, such as to less than 1,000 Å, such as less than 750 Å, such as in the range of 400 Å to 600 Å, such as about 500 Å.

Figure 8:
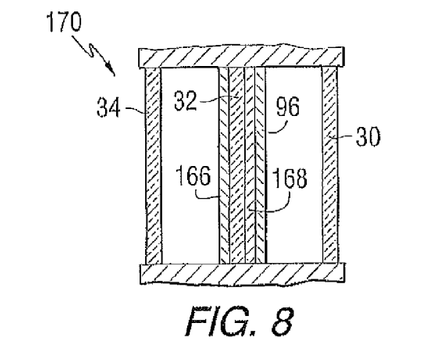
FIG. 8 is a side, sectional view (not to scale) of another oven door incorporating features of the invention.

FIG. 8 shows an oven door 170, such as a self-cleaning oven door, of the invention in which both the inner and outer plies 30, 34 are made of clear glass. The vents 150, 156 have been eliminated. The second ply 32 has a metal oxide coating 166, such as a SUNGATE® 500 coating commercially available from PPG Industries, Inc., on one surface, such as the No. 4 surface. A metal layer-containing coating 168, such as a coating containing three metallic silver layers, can be located on another surface, such as the No. 3 surface. A thin protective coating 96 such as described above can be deposited over the coating 168. In one embodiment, the protective coating 96 can have a thickness in the range of 100 Å to 1,000 Å, such as 400 Å to 600 Å, such as 500 Å. While the vents 150, 156 have been eliminated, it is advantageous if the panels 30, 32, 34 are not tightly sealed in the door 170 to the extent that they are airtight in order to prevent damage to the door when the air in the air gaps 152, 154 is heated during operation or cleaning. Thus, air should still be able to flow into and out of the air gaps 152, 154 (such as around the edges of the panels in the door framework) but the large conventional vents 150, 156 have been eliminated such that there is little or no chance for cleaning solution to contact the outer coating 166. In one embodiment the vents, if present, can have openings of less than 10 square inches per side of the oven door, such as less than 8 square inches, such as less than 5 square inches, such as less than 3 square inches.

Figure 9:
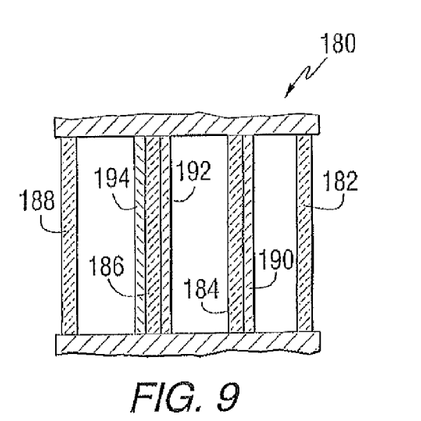
FIG. 9 is a side, sectional view (not to scale) of a further oven door incorporating features of the invention.

FIG. 9 shows another embodiment of the invention in which an oven door 180 has four plies of glass 182, 184, 186, and 188. The first and fourth plies 182, 188 can be clear glass. The second ply 184 can have a metal layer-containing coating 190, such as described above for the coating 52 having a protective coating 96, on a surface, such as the No. 3 surface. The third ply 186 can have a metal layer-containing coating 192, such as the coating 52 described above having a protective coating 96, on a surface, such as the No. 5 surface or the No. 6 surface. An optional non-metal layer-containing coating 194, such as a SUNGATE® 500 coating, can be deposited on a surface, such as the No. 6 surface if the coating 192 is on the No. 5 surface.

Designing a self-cleaning oven door without the conventional vents provides several advantages. For example, eliminating or reducing the size of the vents also eliminates or reduces the requirement for the outermost metal-containing coating to have a protective coating to protect it against solvent attack. Since the likelihood is small that solvent can penetrate the redesigned door, the protective coating, such as a metal oxide coating as described above, can be reduced from a thickness of 2,000 Å to 500 Å. Additionally, the improved oven door does not introduce as much heat into the ambient atmosphere, such as the kitchen, since the convective flow through the vents is eliminated. Eliminating the vents also lowers the chemical durability requirements for the coatings, which in turn lowers the costs to make the door. While the vents have been eliminated, the presence of the metal layer-containing coating provides sufficient heat reflection to meet conventional commercial requirements.

In one practice of the invention, the conventional NESA coatings, which have an emissivity of about 0.2 at 70° F. (21° C.), are replaced with at least one metal layer-containing coating having an emissivity of less than or equal to 0.15, such as in the range of 0.05 to 0.1, such as about 0.08 at 70° F. (21° C.), and/or, optionally, a metal oxide coating, such as a SUN-GATE® 500 coating, having an emissivity of less than 0.2, such as in the range of 0.15 to 0.2 at 70° F. (21° C.).

As will be appreciated by one skilled in the art, the lower the emissivity, the better the heat reflection. The emissivity of conventional metal oxide coatings, such as conventional NESA coatings, tends to steadily rise as the coating is heated or as the temperature of an object perceived through the coating increases (for example in a temperature range of 200° F. to 1,200° F. (93° C. to 648° C.)). However, coatings containing metal reflective layers as taught by the invention, such as coatings including three silver-containing layers as described above, tend to show a much smaller rise in emissivity in this temperature range and can even decrease in emissivity in this temperature range. Therefore, in one non-limiting aspect, the invention teaches providing a coated panel, such as for use in an appliance transparency, that has a coating that provides an emissivity slope of less than $10 \times 10^{-5}$ per °F. in the temperature range of 200° F. to 1,200° F. (93° C. to 648° C.), such as less than $7 \times 10^{-5}$ per °F., such as less than $5 \times 10^{-5}$ per °F., such as less than $3 \times 10^{-5}$ per °F., such as less than $1 \times 10^{-5}$ per °F. By "emissivity slope" is meant the change in emissivity over the change in temperature.

A substrate, such as a glass substrate having a metal layer-containing coating 52 and optionally a protective coating 96, can be heat-treated before the coated panel is installed into an article. For example, the coated substrate can be tempered in conventional manner to provide a heated-strengthened coated panel. The presence of the coating 52 and optional protective coating 96 should not adversely impact upon the tempering process.

Moreover, a decorative or functional coating can be applied over all or a portion of a coated panel of the invention either before or after heat treatment. For example, a ceramic frit can be applied over all or a portion of the coated panel before heat treatment, such as tempering. Upon heating to sufficient temperatures, the ceramic frit can melt to form banded or colored areas on the panel (shade band). In one non-limiting embodiment, such a coated panel with a shade band formed of frit material can be incorporated into a conventional vehicle transparency, such as a conventional laminated automotive windshield. The ceramic band can be positioned between the plies of the laminated windshield.

A coated panel of the invention could also be processed in other ways. For example, the coated panel can have a screen printed layer applied over at least a portion of the coating in conventional manner. The screen can form a decorative pattern. The coated panel could also have an electrocoat applied over all or a portion of the coated panel using a conventional electrodeposition process.

Figure 10:
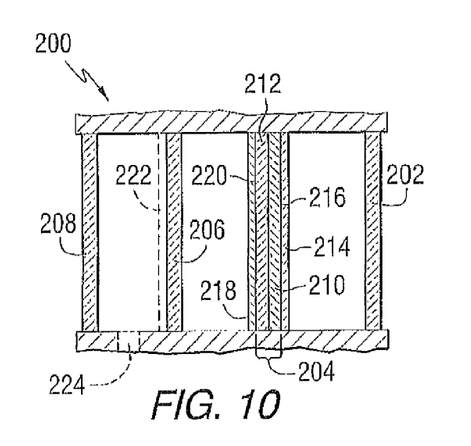
FIG. 10 is a side, sectional view (not to scale) of an additional oven door incorporating features of the invention.

An additional oven door 200 incorporating features of the invention is shown in FIG. 10. The oven door 200 includes a first (innermost), e.g., monolithic, panel 202, a second composite panel 204, a third, e.g., monolithic, panel 205, and a fourth, e.g., monolithic, panel 206. The panels 202-206 can be of any of the panel materials described above and can be of any desired thickness. However, in this aspect of the invention, at least one of the panels of the transparency 200 is a composite panel, i.e., a panel formed by two or more separate sheets, e.g., glass sheets, with the adjacent surfaces of the glass sheets abutting or contacting each other so that there is no air gap between the sheets. In the illustrated embodiment, the second panel 204 is formed by a first glass sheet 210 and a second glass sheet 212. For example, the monolithic panels 202, 206, 208 can have a thickness of 5 mm and the glass sheets 210, 212 making up the composite panel 204 can each have a thickness of 2.5 mm. A first coating 214 can be deposited on the inner surface 216 of the first sheet 210 (corresponding to the No. 3 surface) and a second coating 218 can be formed on the outer surface 220 of the second sheet 212 (corresponding to the No. 4 surface). An optional third coating 222 can be deposited on another of the panels, such as the No. 5 or No. 6 surfaces.

In this aspect of the invention, one or both of the first and second coatings 214, 218 can be a metal layer-containing coating such as described above for coating 52 and can include a protective coating 96. Alternatively, one or both of the coatings 214, 218 can be non-metal layer-containing coatings, such as described above for coating 50. Or, one coating can be a metal layer-containing coating and the other coating can be a non-metal layer-containing coating. The composite panel 204 can be positioned or adhered together with the adjacent sides of the sheets 210, 212 contacting each other so that there is no air gap between the sheets 210, 212.

The use of at least one composite panel in an oven transparency provides advantages over using only monolithic panels with coatings on both sides. For example, each sheet of the composite panel need only be coated on one side, which means the sheet does not have to be run with a coating face down in the coater to coat the opposite side. This avoids damage to the bottom coating as it is moved through the coater. The separate sheets can then be positioned with their respective coatings facing outwardly to form the panel. Additionally, since the sheets need only be coated on one side, the sheets are easier to heat treat, e.g., temper, because it is easier for heat to enter the glass if there is a heat reflective coating on only one side of the glass.

A vent 224 can be positioned between the third and fourth panels as shown in FIG. 10 or, optionally, between the second and third panels.

While the above discussion focused on the practice of the invention with oven transparencies, it should be appreciated that the invention is not limited to the above-described exemplary uses. For example, a coated panel of the invention can be used in a conventional refrigerator door, such as a door to a commercial refrigeration cabinet used in grocery stores. The coated surface can be positioned to face the interior of the refrigeration cabinet. The presence of a coating of the invention as described above on the panel can help decrease condensation on the interior of the refrigerator door and help improve visibility through the refrigerator door.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:
1. An oven transparency, comprising:
  a first panel having a first major surface and a second major surface;
  a second panel spaced from the first panel and having a first major surface and a second major surface, with the first major surface of the second panel facing the second major surface of the first panel;

a first coating deposited over at least a portion of the second major surface of the second panel, the first coating consisting essentially of at least one metal oxide layer; and a second coating deposited over at least a portion of one of the second major surface of the first panel or the first major surface of the second panel, the second coating comprising:

a first dielectric layer comprising at least one transparent metal oxide;

a first metallic layer;

a second dielectric layer comprising at least one transparent metal oxide; and a second metallic layer; and a protective coating over the second coating and comprising a mixture of silica and alumina and having a thickness in the range of 100 Å to 50,000 Å.

2. The transparency of claim 1, wherein the first coating comprises a doped metal oxide layer.

3. The transparency of claim 2, wherein the first coating comprises fluorine doped tin oxide.

4. The transparency of claim 1, wherein the first coating is a CVD coating.

5. The transparency of claim 1, wherein the second coating is an MSVD coating.

6. The transparency of claim 1, wherein the second coating further comprises:

a third dielectric layer comprising at least one transparent metal oxide; and a third metallic layer.

7. The transparency of claim claim 1, wherein the protective coating comprises 85 wt.% to 10 wt.% silica and 15 wt.% to 90 wt.% alumina.

8. An oven transparency, comprising:

a first panel having a first major surface and a second major surface;

a second panel spaced from the first panel and having a first major surface and a second major surface, with the first major surface of the second panel facing the second major surface of the first panel;

a first coating deposited over at least a portion of the second major surface of the second panel, the first coating consisting essentially of fluorine doped tin oxide; and a second coating deposited over at least a portion of one of the second major surface of the first panel or the first major surface of the second panel, the second coating comprising:

a first dielectric layer comprising at least one transparent metal oxide;

a first metallic layer;

a second dielectric layer comprising at least one transparent metal oxide;

a second metallic layer;

a third dielectric layer comprising at least one transparent metal oxide;

a third metallic layer; and a protective coating over at least a portion of the second coating, wherein the protective coating comprises 85 wt.% to 10 wt.% silica and 15 wt.% to 90 wt.% alumina and having a thickness in the range of 100 Å to 50,000 Å.

* * * * *